(12) United States Patent  
Lu et al.

(10) Patent No.: US 10,585,521 B2  
(45) Date of Patent: Mar. 10, 2020

(54) DISPLAY PANEL, METHOD FOR CONTROLLING DISPLAY PANEL, AND DISPLAY DEVICE

(71) Applicant: Shanghai Tianma Micro-Electronics Co., Ltd., Shanghai (CN)

(72) Inventors: Feng Lu, Shanghai (CN); Qijun Yao, Shanghai (CN)

(73) Assignee: SHANGHAI TIANMA MICRO-ELECTRONIC CO., LTD., Shanghai (CN)

( * ) Notice: Subject to any disclaimer, the term of this patent is extended or adjusted under 35 U.S.C. 154(b) by 0 days.

(21) Appl. No.: 15/789,137

(22) Filed: Oct. 20, 2017

(65) Prior Publication Data

US 2018/0348944 A1  Dec. 6, 2018

(30) Foreign Application Priority Data

Jun. 6, 2017  (CN) .......................... 2017 1 0419100

(51) Int. Cl.  
*G06F 3/041* (2006.01)  
*G09G 3/20* (2006.01)

(52) U.S. Cl.  
CPC .......... *G06F 3/0414* (2013.01); *G06F 3/0416* (2013.01); *G06F 3/0412* (2013.01); *G09G 3/2092* (2013.01); *G09G 2310/0286* (2013.01); *G09G 2354/00* (2013.01)

(58) Field of Classification Search  
CPC .... G06F 3/0414; G06F 3/0416; G06F 3/0412; G09G 2310/0286; G09G 2354/00; G09G 3/2092  
See application file for complete search history.

(56) References Cited

U.S. PATENT DOCUMENTS

| | | | |
|---|---|---|---|
| 2011/0226069 A1* | 9/2011 | Kim ....................... | G01L 1/2293 73/862.045 |
| 2013/0293484 A1* | 11/2013 | Singh ..................... | G06F 1/3262 345/173 |
| 2016/0377501 A1* | 12/2016 | Agarwal ................. | G01L 25/00 73/1.15 |
| 2017/0010723 A1 | 1/2017 | Smith et al. | |

* cited by examiner

*Primary Examiner* — Abhishek Sarma  
(74) *Attorney, Agent, or Firm* — Tarolli, Sundheim, Covell & Tummino LLP

(57) ABSTRACT

Embodiments of the present disclosure provide a display panel, a control method and a display device, which relate to the field of force touch display technologies, and can improve sensitivity of the force sensing unit. The display panel includes: a plurality of force sensing branches connected in parallel; a plurality of force sensing unit sets corresponding to the plurality of force sensing branches; and a plurality of switch units corresponding to the plurality of force sensing branches; wherein each of the force sensing unit sets includes one or more force sensing unit, each force sensing unit includes two input ends, the input ends of the force sensing units in each of the force sensing unit sets are mutually connected in series or in parallel in a corresponding force sensing branch; and wherein the switch units are arranged in a corresponding one force sensing branches in series.

6 Claims, 16 Drawing Sheets

DISPLAY PANEL, METHOD FOR CONTROLLING DISPLAY PANEL, AND DISPLAY DEVICE

CROSS-REFERENCE TO RELATED APPLICATIONS

The present application claims priority to Chinese Patent Application No. 201710419100.1, filed on Jun. 6, 2017, the content of which is incorporated herein by reference in its entirety.

TECHNICAL FIELD

The present disclosure relates to the field of force touch display technologies and, in particular, to a display panel, a method for controlling the display panel and a display device.

BACKGROUND

With the development of touch display techniques, there is a variety of touch functions and operation manners in the display product. At present, in addition to the conventional touch function, a force touch function is also achieved by providing a force sensing unit in the display product. The force sensing unit is generally a four-end device, including two input ends and two output ends. In the prior art, a display panel includes multiple force sensing units, input ends of the force sensing units are connected with a force detection circuit. During force touch, a bias voltage input circuit provides a bias voltage to the force sensing units, when a user presses the display panel, the panel will deform, so that the voltage value output by the force sensing unit changes, and the force detection circuit judges the magnitude of the press of the user according to the voltage value output by the force sensing unit.

However, since each connecting line is considered as a resistor, which may be load with a voltage, but the total voltage is limited. As a result, sensitivity of the force sensing unit will be low due to the fact that the voltage value output by the force sensing unit is in positive correlation with the bias voltage value, the smaller the bias voltage value, the lower the sensitivity of the force sensing unit.

SUMMARY

In view of the above, embodiments of the present disclosure provide a display panel, a method for controlling the display panel and a display device, which can improve sensitivity of the force sensing unit.

In a first aspect, an embodiment of the present disclosure provides a display panel, including: a plurality of force sensing branches connected in parallel; a plurality of force sensing unit sets respectively corresponding to the plurality of force sensing branches; and a plurality of switch units respectively corresponding to the plurality of force sensing branches; wherein each of the force sensing unit sets includes one or more force sensing units, each force sensing unit includes two input ends, the input ends of the one or more force sensing units in each of the force sensing unit sets are connected in series or in parallel in a corresponding force sensing branch; and wherein each of the plurality of switch units is connected in series in a corresponding force sensing branch.

In a second aspect, an embodiment of the present disclosure provides a display panel, including: a plurality of force sensing branches connected in series; a plurality of force sensing unit sets respectively corresponding to the plurality of force sensing branches; and a plurality of switch units respectively corresponding to the plurality of force sensing branches; wherein each of the force sensing unit sets includes one or more force sensing units, each force sensing unit includes two input ends, the input ends of the one or more of force sensing units in each of the force sensing unit sets are connected in series or in parallel in a corresponding force sensing branch; and wherein each of the plurality of switch units is connected in parallel to a corresponding force sensing branch.

In a third aspect, an embodiment of the present disclosure provides a method for controlling a display panel, wherein the display panel includes: a plurality of force sensing branches connected in parallel; a plurality of force sensing unit sets respectively corresponding to the plurality of force sensing branches; and a plurality of switch units respectively corresponding to the plurality of force sensing branches; wherein each of the force sensing unit sets includes one or more force sensing units, each force sensing unit includes two input ends, the input ends of the one or more force sensing units in each of the force sensing unit sets are connected in series or in parallel in a corresponding force sensing branch; and wherein each of the plurality of switch units is connected in series in a corresponding force sensing branch; wherein the plurality of switch units is divided into a plurality of switch unit sets, each switch unit set includes one or more switch units; wherein the display panel is capable of working in a plurality of force sensing periods, each of the plurality of force sensing periods includes a plurality of force sensing stages corresponding to the plurality of switch unit sets, the method includes: in each of the plurality of force sensing stages, controlling the one or more switch units in the switch unit set corresponding to a present force sensing stage to be turned on, and controlling the one or more switch units in the switch unit set not corresponding to the present force sensing stage to be turned off.

In a fourth aspect, an embodiment of the present disclosure provides a method for controlling a display panel, wherein the display panel includes: a plurality of force sensing branches connected in series; a plurality of force sensing unit sets respectively corresponding to the plurality of force sensing branches; and a plurality of switch units respectively corresponding to the plurality of force sensing branches; wherein each of the force sensing unit sets includes one or more force sensing units, each force sensing unit includes two input ends, the input ends of the one or more force sensing units in each of the force sensing unit sets are connected in series or in parallel in a corresponding force sensing branch; and wherein each of the plurality of switch units is connected in parallel to a corresponding force sensing branch; wherein the plurality of switch units is divided into a plurality of switch unit sets, each switch unit set includes one or more switch units; wherein the display panel is capable of working in a plurality of force sensing periods, each of the plurality of force sensing periods includes a plurality of force sensing stages corresponding to the plurality of switch unit sets, the method includes: in each of the plurality of force sensing stages, controlling the one or more switch units in the switch unit set corresponding to a present force sensing stage to be turned off, and controlling the one or more switch units in the switch unit set not corresponding to the present force sensing stage to be turned on.

In a fifth aspect, an embodiment of the present disclosure provides a display device, including a display panel, wherein the display panel includes: a plurality of force sensing branches connected in parallel; a plurality of force sensing unit sets respectively corresponding to the plurality of force sensing branches; and a plurality of switch units respectively corresponding to the plurality of force sensing branches; wherein each of the force sensing unit sets includes one or more force sensing units, each force sensing unit includes two input ends, the input ends of the one or more force sensing units in each of the force sensing unit sets are connected in series or in parallel in a corresponding force sensing branch; and wherein each of the plurality of switch units is connected in series in a corresponding force sensing branch.

In a sixth aspect, an embodiment of the present disclosure provides a display device, including a display panel, wherein the display panel includes: a plurality of force sensing branches connected in series; a plurality of force sensing unit sets respectively corresponding to the plurality of force sensing branches; and a plurality of switch units respectively corresponding to the plurality of force sensing branches; wherein each of the force sensing unit sets includes one or more force sensing units, each force sensing unit includes two input ends, the input ends of the one or more of force sensing units in each of the force sensing unit sets are connected in series or in parallel in a corresponding force sensing branch; and wherein each of the plurality of switch units is connected in parallel to a corresponding force sensing branch.

In the display panel, display device and control method provided by the embodiments of the present disclosure, the display panel is provided with switch units corresponding to the force sensing units, the force sensing process is divided into multiple stages, in different stages, the plurality of force sensing units can use the input voltage by time division through controlling the switch units, so that at each stage, only a part of force sensing units obtain the bias voltage provided by the bias voltage input circuit to work. However, in the prior art, the bias voltage input circuit needs to provide a bias voltage to all the force sensing units at the same time, compared with the prior art, the embodiments of the present disclosure improves the bias voltage obtained by each force sensing unit during working, so as to improve sensitivity of the force sensing unit.

BRIEF DESCRIPTION OF DRAWINGS

In order to explain the technical solutions in embodiments of the present disclosure or in the prior art more clearly, a brief introduction of the drawings used in the embodiments or the prior art will be provided here. Obviously, the drawings described below are some embodiments of the present disclosure, those skilled in the art can also obtain other drawings according to these drawings without creative work.

DESCRIPTION OF EMBODIMENTS

In order to better understand technical solutions of the present disclosure, embodiments of the present disclosure will be illustrated in detail with reference to the accompanying drawings.

It should be noted that, the embodiments described are only a part of the embodiments of the present disclosure, rather than all of them. All other embodiments obtained by those skilled in the art without creative work shall belong to the protection scope of the present disclosure.

The terms used in the embodiments of the present disclosure are only intended to describe specific embodiments, rather than limit the present disclosure. The expressions "a", "an", "the" and "said" used in a singular form in the embodiments and the claims shall also be interpreted as including the plural form, unless otherwise clearly noted in the context.

It should be understood that, the terms "and/or" refers to an association relation between associated objects, which can include three relations, for example, A and/or B can include: A exists individually, A and B exist at the same time, B exists individually. In addition, the character "/" refers to an "or" relation between the former and latter objects.

Figure 1:
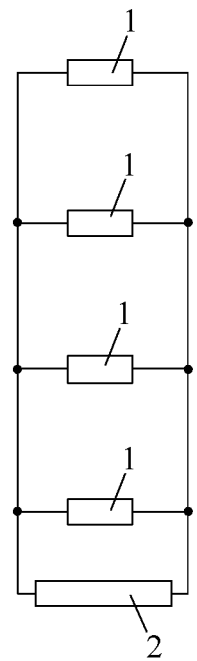
FIG. 1 illustrates a schematic diagram of multiple force sensing units being connected with each other according to the prior art.

As shown in FIG. 1, which illustrates a schematic diagram of multiple force sensing units being connected with each other according to the prior art. A display panel includes multiple force sensing units 1, input ends of the force sensing units 1 are connected in parallel in a bias voltage input circuit 2, FIG. 1 only shows the input ends of the force sensing units 1, but does not show the output ends thereof. The output ends of the force sensing units 1 are connected with a force detection circuit (not shown in FIG. 1). During force touch, the bias voltage input circuit 2 provides a bias voltage to the force sensing units 1, when a user presses the display panel, the panel will deform, so that the voltage value output by the force sensing unit 1 changes, and the force detection circuit judges the magnitude of the press of the user according to the voltage value output by the force sensing unit 1.

Figure 2:
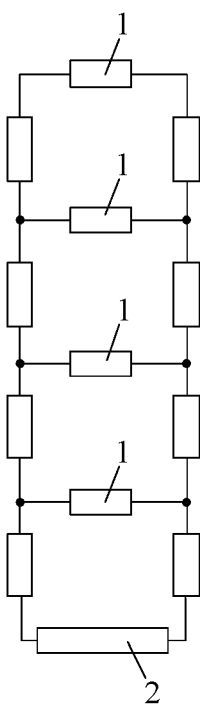
FIG. 2 illustrates an equivalent circuit diagram of FIG. 1 after wiring resistance being taken into consideration.

However, as shown in FIG. 2, which illustrates an equivalent circuit diagram of FIG. 1 after wiring resistance being taken into consideration. Since when input ends of multiple force sensing units 1 are connected with the bias voltage input circuit 2, each connecting line is considered as a resistor, which may be load with a voltage, but the total voltage that can be provided by the bias voltage input circuit 2 is limited. As a result, each force sensing unit 1 can only obtain a relatively small voltage, which in turn causes low sensitivity of the force sensing unit 1, due to the fact that the voltage value output by the force sensing unit 1 is in positive correlation with the bias voltage value, the smaller the bias voltage value, the lower the sensitivity of the force sensing unit 1.

Figure 3:
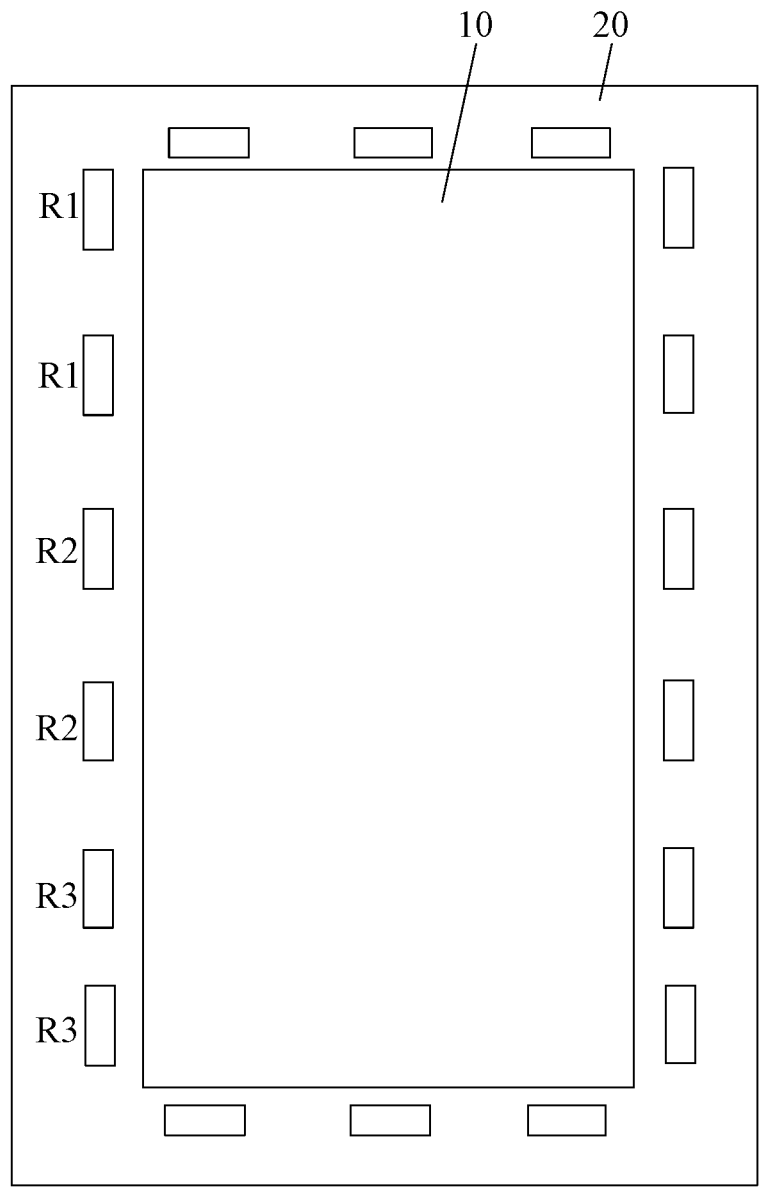
FIG. 3 illustrates a structural schematic diagram of a display panel according to an embodiment of the present disclosure.
Figure 4:
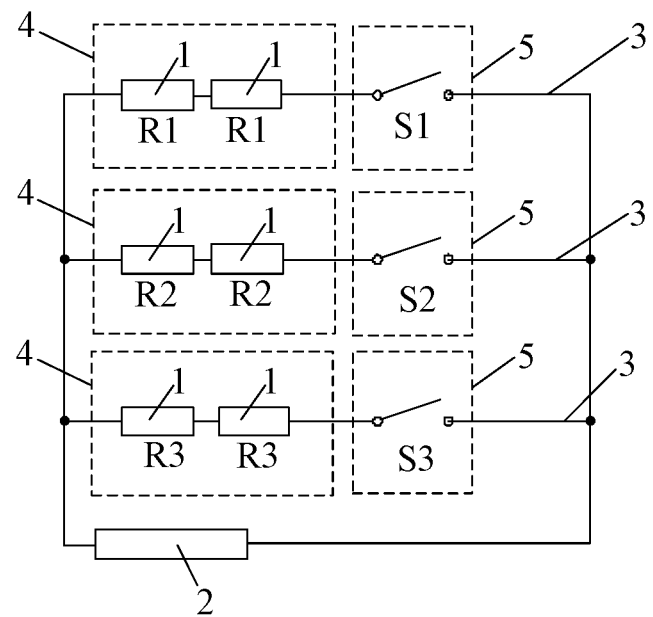
FIG. 4 illustrates a schematic diagram of a connection of a part of force sensing units in FIG. 3.
Figure 5:
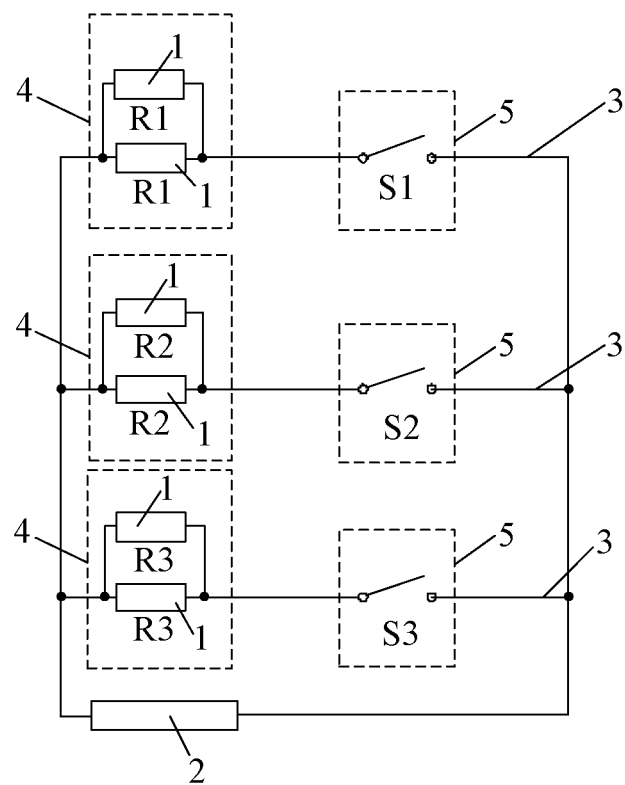
FIG. 5 illustrates a schematic diagram of another connection of a part of force sensing units in FIG. 3.

As shown in FIG. 3, FIG. 4 and FIG. 5, FIG. 3 illustrates a structural schematic diagram of a display panel according to an embodiment of the present disclosure, FIG. 4 illustrates a schematic diagram of a connection of a part of force sensing units in FIG. 3, FIG. 5 illustrates a schematic diagram of another connection of a part of force sensing units in FIG. 3. An embodiment of the present disclosure provides a display panel, including: a plurality of force sensing branches 3 connected in parallel; a plurality of force sensing unit sets 4 corresponding to the plurality of force sensing branches 3, each force sensing unit set 4 includes one or more force sensing unit 1, each force sensing unit 1 includes two input ends, the input ends of the plurality of force sensing units 1 in each force sensing unit set 4 are arranged in the corresponding force sensing branch 3 in series or in parallel; a plurality of switch units 5 corresponding to the plurality of force sensing branches 3, the switch units 5 are arranged in the corresponding force sensing branches 3 in series.

The structure shown in FIG. 4 and FIG. 5 will be taken as an example, the display panel in the embodiments of the present disclosure will be described in detail through the control manner of the display panel. As shown in FIG. 3, FIG. 4 and FIG. 5, the force sensing unit 1 in the display panel includes two first force sensing units R1, two second force sensing units R2 and two third force sensing units R3. The two first force sensing units R1 as a first force sensing unit set 4 are connected with the a switch unit S1 in series in a first force sensing branch 3; the two second force sensing units R2 as a second force sensing unit set 4 are connected with a second switch unit S2 in series in a second force sensing branch 3; and the two third force sensing units R3 as a third force sensing unit set 4 are connected with a third switch unit S3 in series in a third force sensing branch 3.

The plurality of force sensing units 1 shown in FIG. 4 and FIG. 5 can be controlled through a first manner as follows, a plurality of switch units 5 is divided into a plurality switch unit sets, each switch unit set includes one or more switch unit 5. For example, the plurality of switch units 5 in FIG. 4 or FIG. 5 is divided into three switch unit sets, the first switch unit set includes a first switch unit S1, the second switch unit set includes a second switch unit S2, and the third switch unit set includes a third switch unit S3. The display panel works in multiple force sensing periods, each force sensing period successively includes a first force sensing stage corresponding to the first switch unit set, a second force sensing stage corresponding to the second switch unit set and a third force sensing stage corresponding to the third switch unit set. At the first force sensing stage, the first switch unit S1 is turned on, the second switch unit S2 and the third switch unit S3 are turned off, at this time, a bias voltage input circuit 2 only needs to provide a voltage to the two first force sensing units R1, and detect voltage values output by the two first force sensing units R1, so as to judge the magnitude of the force suffered by the display panel at the positions of the two first force sensing units R1; at the second force sensing stage, the second switch unit S2 is turned on, the first switch unit S1 and the third switch unit S3 are turned off, at this time, the bias voltage input circuit 2 only needs to provide a voltage to the two second force sensing units R2, and detect voltage values output by the two second force sensing units R2, so as to judge the magnitude of the force suffered by the display panel at the positions of the two second force sensing units R2; at the third force sensing stage, the third switch unit S3 is turned on, the first switch unit S1 and the second switch unit S2 are turned off, at this time, the bias voltage input circuit 2 only needs to provide a voltage to the two third force sensing units R3, and detect voltage values output by the two third force sensing units R3, so as to judge the magnitude of the force suffered by the display panel at the positions of the two third force sensing units R3.

Figure 6:
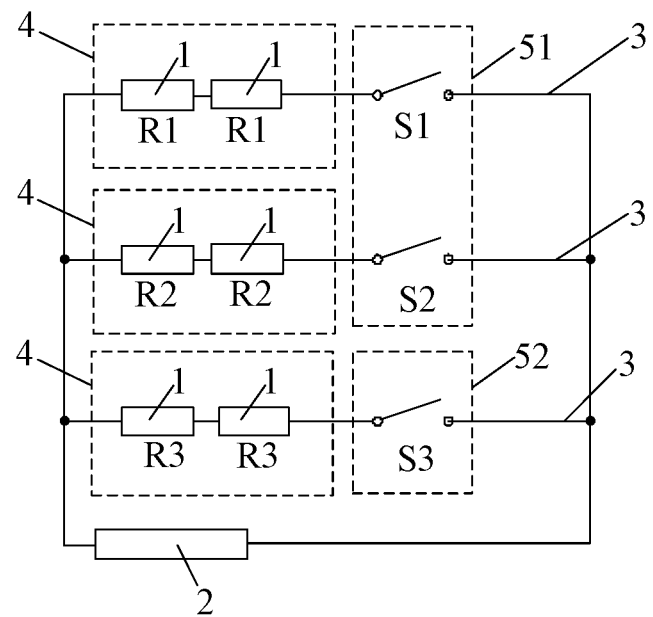
FIG. 6 illustrates a schematic diagram of a switch unit in FIG. 4 being divided according to a second manner.
Figure 7:
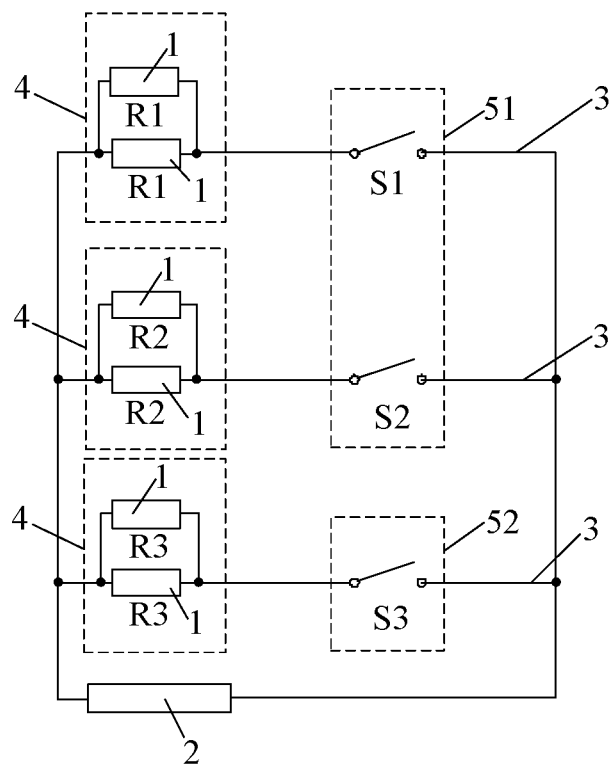
FIG. 7 illustrates a schematic diagram of a switch unit in FIG. 5 being divided according to a second manner.

Besides, the plurality of force sensing units 1 shown in FIG. 4 and FIG. 5 can also be controlled through a second manner as follows, a plurality of switch units 5 is divided into a plurality switch unit sets, each switch unit set includes one or more switch unit 5. For example, the plurality of switch units 5 in FIG. 4 or FIG. 5 is divided into two switch unit sets, as shown in FIG. 6 and FIG. 7, FIG. 6 illustrates a schematic diagram of a switch unit in FIG. 4 being divided according to the second manner, FIG. 7 illustrates a schematic diagram of a switch unit in FIG. 5 being divided according to the second manner. The first switch unit set 51 includes a first switch unit S1 and a second switch unit S2, the second switch unit set 52 includes a third switch unit S3. The display panel works in multiple force sensing periods, each force sensing period successively includes a first force sensing stage corresponding to the first switch unit set 51, a second force sensing stage corresponding to the second switch unit set 52. At the first force sensing stage, the first switch unit S1 and the second switch unit S2 are turned on, the third switch unit S3 is turned off, at this time, a bias voltage input circuit 2 only needs to provide a voltage to the two first force sensing units R1 and two second force sensing units R2, and detect voltage values output by the two first force sensing units R1 and the two second force sensing units R2, so as to judge the magnitude of the force suffered by the display panel at the positions of the two first force sensing units R1 and the two second force sensing units R2; at the second force sensing stage, the third switch unit S3 is turned on, the first switch unit S1 and the second switch unit S2 are turned off, at this time, the bias voltage input circuit 2 only needs to provide a voltage to the two third force sensing units R3, and detect voltage values output by the two third force sensing units R3, so as to judge the magnitude of the force suffered by the display panel at positions of the two third force sensing units R3.

It should be understood that, in the structure shown in FIG. 4, the plurality of force sensing units 1 in each force sensing branch 3 is mutually connected in series, in the structure shown in FIG. 5, the plurality of force sensing units 1 in each force sensing branch 3 is mutually connected in parallel. When considering resistance of the connecting lines, if one switch unit 5 is turned on, which means that, in the corresponding force sensing branch 3, two force sensing units 1 in FIG. 4 are connected in series and then connected with the resistance of the connecting line in series, while two force sensing units 1 in FIG. 5 are connected in parallel and then connected with the resistance of connecting line in series. Therefore, compared with FIG. 5, in the structure shown in FIG. 4, the voltage obtained by the force sensing unit 1 after voltage division is larger, so that the sensitivity of the force sensing unit 1 is higher. Besides, the plurality of force sensing units 1 can also be controlled through other manners except for the above-mentioned first manner and second manner, as long as the force sensing units 1 can use the input voltage by time division, i.e., in each stage, only a part of the force sensing units 1 can obtain the bias voltage provided by the bias voltage input circuit 2 to work.

The display panel provided by the embodiments of the present disclosure is provided with switch units corresponding to the force sensing units, the force sensing process is divided into multiple stages, in different stages, the plurality of force sensing units can use the input voltage by time division through controlling the switch units, so that at each stage, only a part of the force sensing units obtain the bias voltage provided by the bias voltage input circuit to work. However, in the prior art, the bias voltage input circuit needs to provide a bias voltage to all the force sensing units at the same time, compared with the prior art, the embodiments of the present disclosure improves the bias voltage obtained by each force sensing unit during working, so as to improve sensitivity of the force sensing unit.

Figure 8:
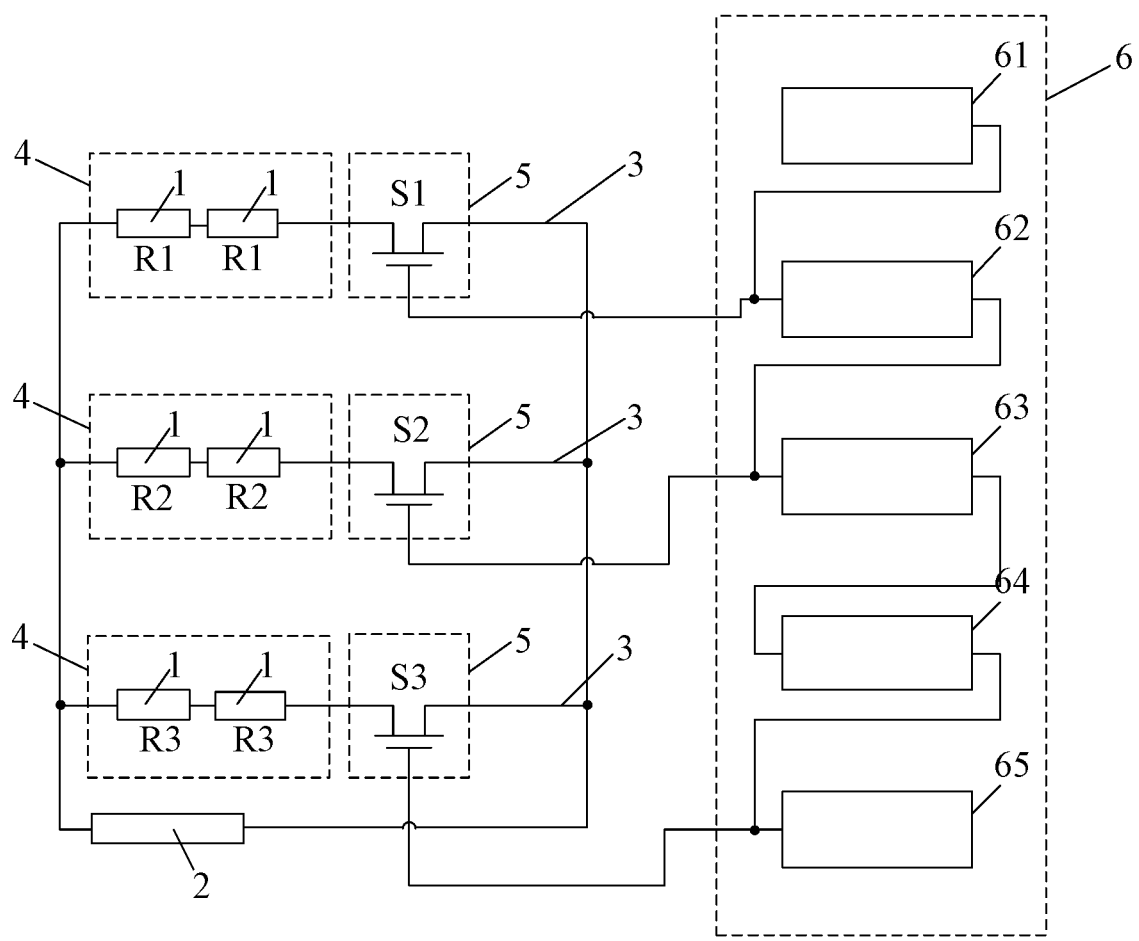
FIG. 8 illustrates a schematic diagram of another connection of a part of force sensing units in FIG. 3.
Figure 9:
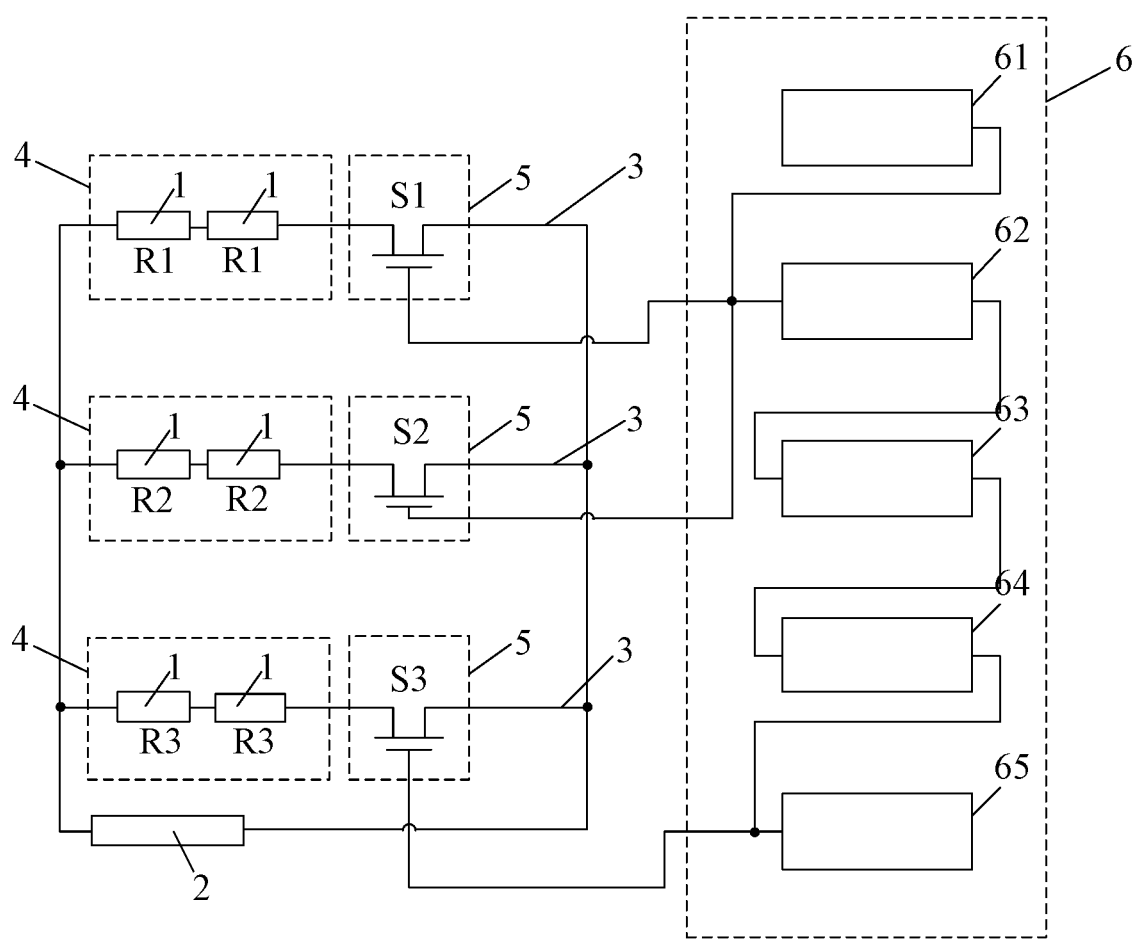
FIG. 9 illustrates a schematic diagram of another connection of a part of force sensing units in FIG. 3.

Optionally, as shown in FIG. 8 and FIG. 9, FIG. 8 illustrates a schematic diagram of another connection of a part of force sensing units in FIG. 3, FIG. 9 illustrates a schematic diagram of another connection of a part of force sensing units in FIG. 3. Each switch unit 5 has a control end; the display panel includes a gate electrode drive circuit 6, the gate electrode drive circuit 6 includes a plurality of vertical shift registers; the shift registers include a plurality of assigned shift registers, each assigned shift register is corresponding to one or more switch unit 5; an input end of the assigned shift register is electrically connected with the control end of the corresponding switch unit 5.

The gate electrode drive circuit 6 is configured to provide a scan signal to the gate line in the display area, in order to achieve the turn-on or turn-off of the thin film transistor connected with the gate line in a display area, so as to achieve display function. Since the vertical shift registers in the gate electrode drive circuit 6 successively output a pulse signal to each gate line, therefore, the switch units 5 can be controlled directly using the pulse signals output by the shift registers. The structure shown in FIG. 8 is corresponding to the first manner, the gate electrode drive circuit 6 includes successively vertical a first shift register 61, a second shift register 62, a third shift register 63, a fourth shift register 64 and a fifth shift register 65, where the first shift register 61, the second shift register 62 and the fourth shift register 64 are assigned shift registers, an output end of the first shift register 61 is electrically connected with a control end of the corresponding first switch unit S1, an output end of the second shift register 62 is electrically connected with a control end of the corresponding second switch unit S2, an output end of the fourth shift register 64 is electrically connected with a control end of the corresponding third switch unit S3. During the working process of the gate electrode drive circuit 6, the first shift register 61 firstly outputs a turn-on level (a level for turning on the thin film transistor connected with the corresponding gate line in the display area), at the same time, the level is output to the control end of the first switch unit S1, so that the first switch unit S1 is turned on, while all other shift registers output a turn-off level, that is, the second switch unit S2 and the third switch unit S3 are turned off, thereby entering into the first force sensing stage; and then, the first shift register 61, the third shift register 63, the fourth shift register 64 and the fifth shift register 65 output a turn-off level, the second shift register 62 outputs a turn-on level, so that the second switch unit S2 is turned on, the first switch unit S1 and the third switch unit S3 are turned off, thereby entering into the second force sensing stage; and then, the third shift register 63 outputs a turn-on level, the other shift registers output a turn-off level, so that all switch units 5 are turned off; and then, the fourth shift register 64 outputs a turned on level, the other shift registers output a turn-off level, so that the third switch unit S3 is turned on, the first switch unit S1 and the second switch unit S2 are turned off, thereby entering into the third force sensing stage. Therefore, the switch unit 5 can be directly controlled by the gate electrode drive circuit 6, it is unnecessary to provide corresponding control circuit separately, so as to save costs and reduce occupied space. Besides, the structure shown in FIG. 9 is corresponding to the second manner, where the output end of the first shift register 61 is electrically connected with corresponding control ends of the first switch unit S1 and the second switch unit S2, the output end of the fourth shift register 64 is electrically connected with the control end of the third switch unit S3, the control manner of each switch unit 5 by the gate electrode drive circuit 6 is similar to the control manner in FIG. 6, which will not be repeated herein.

Optionally, as shown in FIG. 8 or FIG. 9, the switch unit 5 is a first thin film transistor. The display panel includes a plurality sub-pixel units (not shown in figures) arranged in a matrix, each sub-pixel unit is corresponding to one second thin film transistor (not shown in figures), the second thin film transistor is electrically connected with the above-mentioned gate electrode drive circuit 6. The gate electrode of the second thin film transistor corresponding to each row of sub-pixel units is electrically connected with the output end of one shift register in the gate electrode drive circuit 6 through the gate line; the first thin film transistor and the second thin film transistor are both N-type thin film transistors or P-type thin film transistors.

Optionally, as shown in FIG. 3, the display panel includes a display area 10 and a non-display area 20 surrounds the display area 10; the plurality of force sensing unit sets are located at the non-display area 20, so as to avoid the influence of the force sensing units on display.

Figure 10:
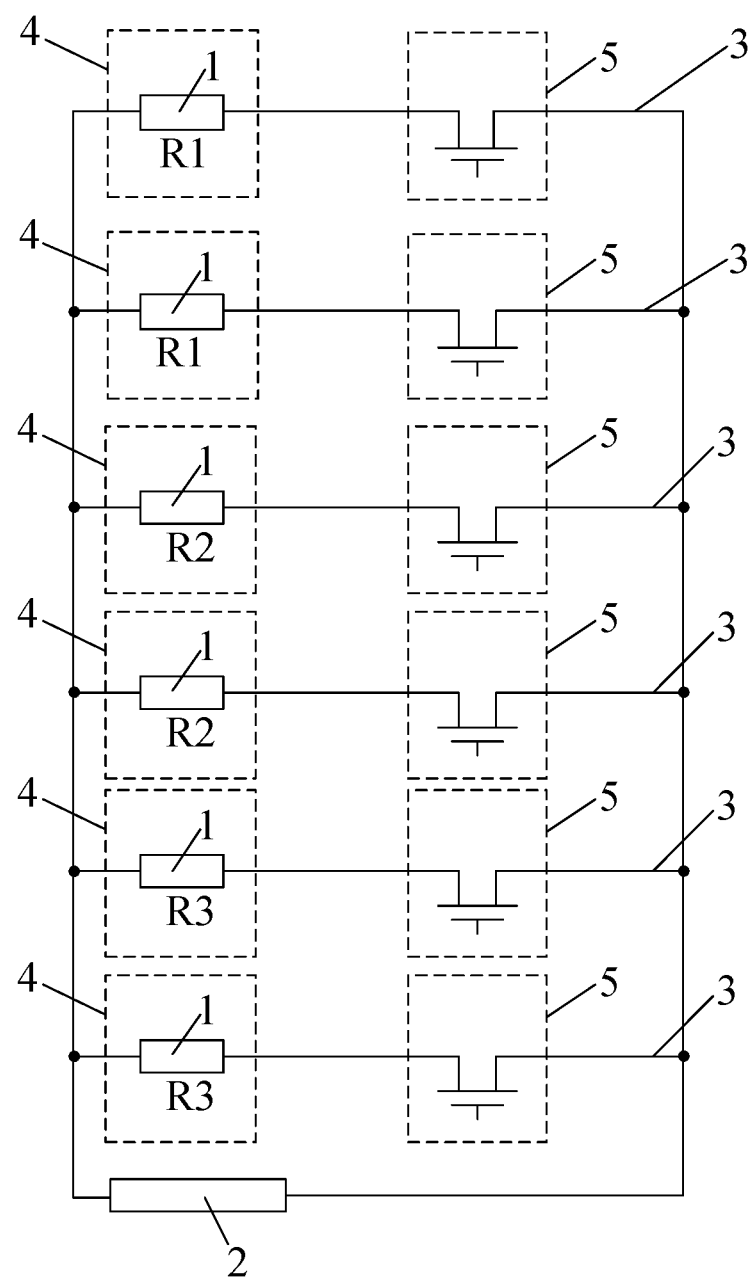
FIG. 10 illustrates a schematic diagram of another connection of a part of force sensing units in FIG. 3.

Optionally, as shown in FIG. 10, FIG. 10 illustrates a schematic diagram of another connection of a part of force sensing units in FIG. 3. Each force sensing unit set 4 only includes one force sensing unit 1. In the structure shown in FIG. 10, during the force detecting process, six switch units 5 are divided into six switch unit sets, that is, each switch unit set only includes one switch unit 5, the display panel works in a plurality of force sensing periods, each force sensing period successively includes six force sensing stages respectively corresponding to six switch units 5, in each force sensing stage, only the corresponding switch unit 5 is turned on, all other switch units 5 are turned off, thus, the bias voltage input circuit 2 only needs to provide a voltage to one force sensing unit 1, the bias voltage obtained by each force sensing unit 1 during working can be further increased, so as to further improve sensitivity of the force sensing unit 1.

Figure 11:
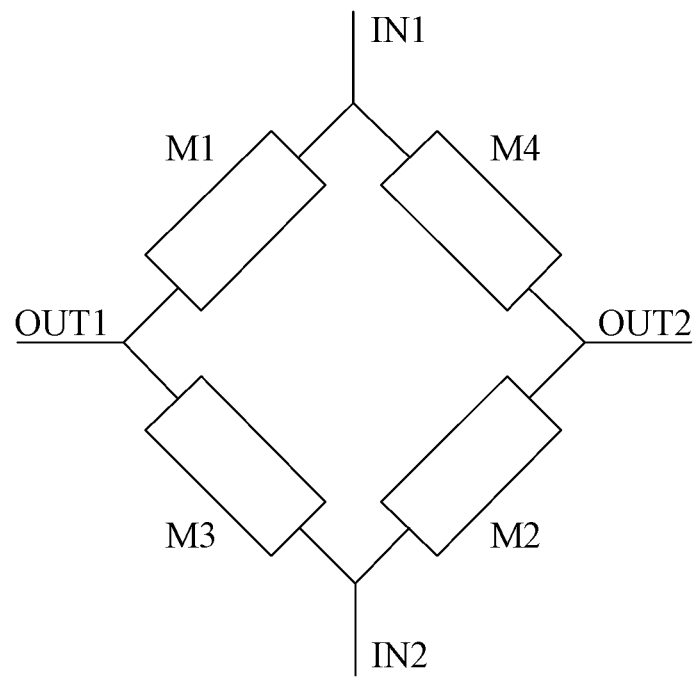
FIG. 11 illustrates a structural schematic diagram of a force sensing unit according to an embodiment of the present disclosure.

Optionally, as shown in FIG. 11, FIG. 11 illustrates a structural schematic diagram of a force sensing unit according to an embodiment of the present disclosure. Each force sensing unit includes a first input end IN1, a second input end IN2, a first output end OUT1, a second output end OUT2, a first strain force sensor M1, a second strain force sensor M2, a third strain force sensor M3 and a fourth strain force sensor M4. In each force sensing unit, the first strain force sensor M1 is connected in series between the first input end IN1 and the first output end OUT1, the second strain force sensor M2 is connected in series between the second input end IN2 and the second output end OUT2, the third strain force sensor M3 is connected in series between the second input end IN2 and the first output end OUT1, the fourth strain force sensor M4 is connected in series between the first input end IN1 and the second output end OUT2. The first input end IN1 and the second input end IN2 are configured to connect with the bias voltage input circuit, the bias voltage input circuit provides a bias voltage, when each strain force sensor is applied with a force, the voltage values output by the first output end OUT1 and the second output end OUT2 will change, so that the touch force can be obtained through detecting and calculating the voltage values output by the first output end OUT1 and the second output end OUT2.

Optionally, the first strain force sensor M1 and the second strain force sensor M2 have a first force sensing orientation, the third strain force sensor M3 and the fourth strain force sensor M4 have a second force sensing orientation, and the first force sensing orientation is different from the second force sensing orientation. The strain force sensor has a force sensing direction, a force is applied in the direction of the force sensing orientation, the resistance of the strain force sensor will be changed in a greatest extent, when a force is applied in the other directions, the resistance of the strain force sensor will be changed in a small extent. The first strain force sensor M1 and the second strain force sensor M2 have the same force sensing orientation, the third strain force sensor M3 and the fourth strain force sensor M4 have the same force sensing orientation, that is, when the display panel is applied with a force, the extent of resistance change of the first strain force sensor M1 and the second strain force sensor M2 are identical, the extent of resistance change of the third strain force sensor M3 and the fourth strain force sensor M4 are identical, thus, coordinating with the structure of Wheatstone bridge, influence of temperature on the force sensing unit can be eliminated.

Optionally, in order to eliminate the influence of temperature on the force sensing unit, except for the manner of arranging each strain force sensor in the force sensing unit according to the above-mentioned two different force sensing orientations, it is also possible that the strain force sensors in the force sensing unit can be placed in different two layers, where the first strain force sensor M1 and the second strain force sensor M2 are located at the first force sensing layer, the third strain force sensor M3 and the fourth strain force sensor M4 are located at the second force sensing layer, the first force sensing layer and the second force sensing layer are different layers. When the display panel is being pressed, the force suffered by different layers are different, therefore, the extent of resistance change of the first strain force sensor M1 and the second strain force sensor M2 are identical, the extent of resistance change of the third strain force sensor M3 and the fourth strain force sensor M4 are identical, thus, coordinating with the structure of Wheatstone bridge, influence of temperature on the force sensing unit can be eliminated.

Figure 12:
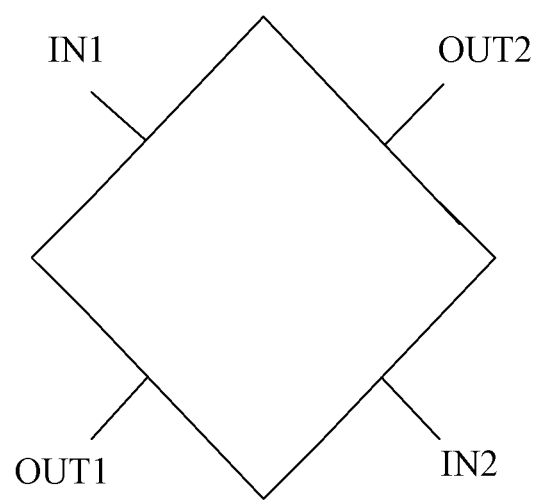
FIG. 12 illustrates a structural schematic diagram of another force sensing unit according to an embodiment of the present disclosure.

Optionally, except for the force sensing unit of the Wheatstone bridge structure, as shown in FIG. 12, FIG. 12 illustrates a structural schematic diagram of another force sensing unit according to an embodiment of the present disclosure. The force sensing unit can also be a silicon piezoresistive force sensor, the silicon piezoresistive force sensor can be of a quadrilateral structure, four edges are respectively connected with the first input end IN1, the second input end IN2, the first output end OUT1 and the second output end OUT2, the first input end IN1 and the second input end IN2 are respectively connected with two opposite edges, the first output end OUT1 and the second output end OUT2 are respectively connected with the other two opposite edges. The bias voltage input circuit is respectively connected with the first input end IN1 and the second input end IN2, and configured to provide a bias voltage to the silicon piezoresistive force sensor, a drive chip is respectively connected with the first output end OUT1 and the second output end OUT2, the drive chip is configured to obtain a strain voltage difference of the silicon piezoresistive force sensor, when the display panel deforms under a pressing force, correspondingly, the impedance of the silicon piezoresistive force sensor changes, which causes the strain voltage thereof change correspondingly, thus, the magnitude of the touch force suffered by the display panel can be judged according to the strain voltage obtained by the first output end OUT1 and the second output end OUT2. The silicon piezoresistive force sensor is made by forming a strain resistance through an ion implantation manner on the silicon wafer and then packaging. Compared with the force sensing unit of the Wheatstone bridge structure, the effect of zero drifting restrain of the silicon piezoresistive force sensor is better.

Figure 13:
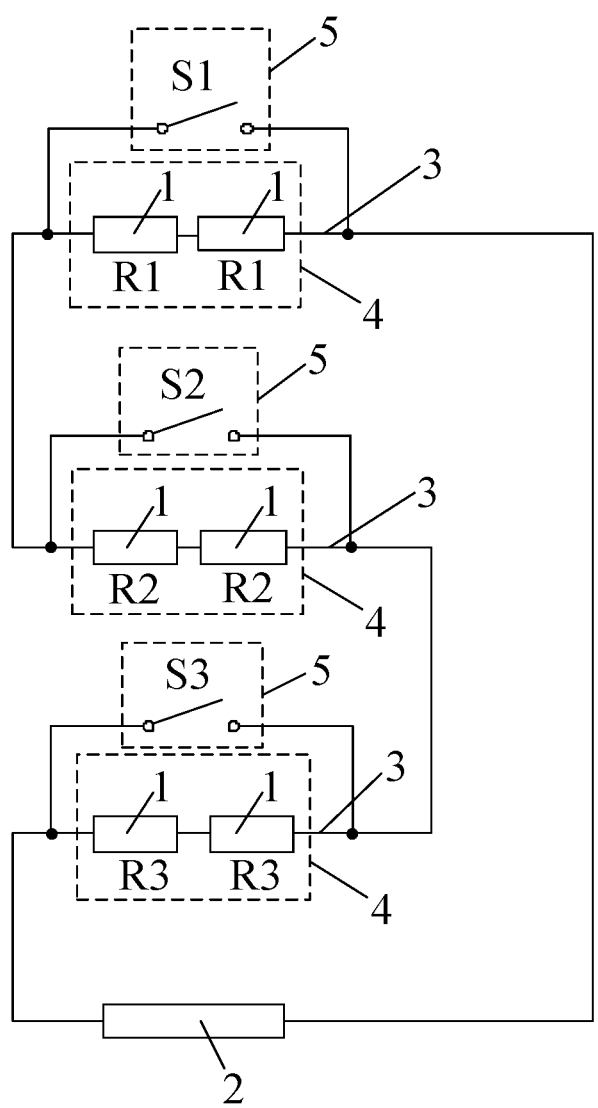
FIG. 13 illustrates a schematic diagram of another connection of a part of force sensing units in FIG. 3.
Figure 14:
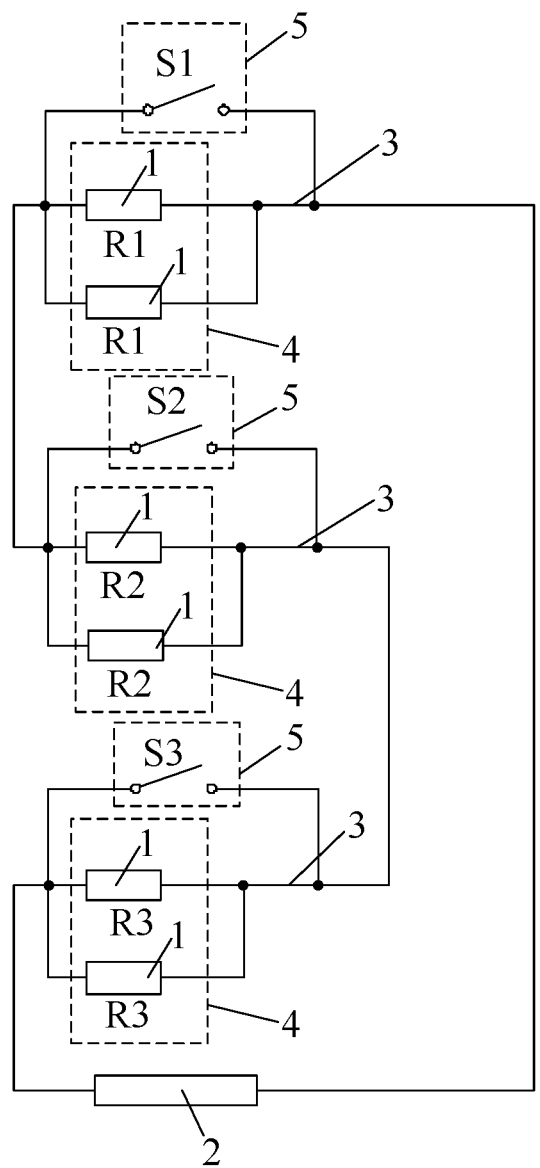
FIG. 14 illustrates a schematic diagram of another connection of a part of force sensing units in FIG. 3.

As shown in FIG. 3, FIG. 13 and FIG. 14, FIG. 13 illustrates a schematic diagram of another connection of a part of force sensing units in FIG. 3, FIG. 14 illustrates a schematic diagram of another connection of a part of force sensing units in FIG. 3. An embodiment of the present disclosure further provides a display panel, including: a plurality of force sensing branches 3 connected in series; a plurality of force sensing unit sets 4 corresponding to the plurality of force sensing branches 3, each force sensing unit set 4 includes one or more force sensing unit 1, each force sensing unit 1 includes two input ends, as shown in FIG. 13, the input ends of the plurality of force sensing units 1 in each force sensing unit set 4 are arranged in the corresponding force sensing branch 3 in series, or, as shown in FIG. 14, the input ends of the plurality of force sensing units 1 in each force sensing unit set 4 are arranged in the corresponding force sensing branch in parallel; a plurality of switch units 5 corresponding to the plurality of force sensing branches 3, the switch units 5 are connected with the corresponding force sensing branches 3 in parallel.

The structure shown in FIG. 13 and FIG. 14 will be taken as an example, the display panel in the embodiments of the present disclosure will be described in detail through the control manner of the display panel. As shown in FIG. 3, FIG. 13 and FIG. 14, the force sensing unit 1 in the display panel includes two first force sensing units R1, two second force sensing units R2 and two third force sensing units R3, where the two first force sensing units R1 as a first force sensing unit set 4 are connected with a first switch unit S1 in parallel in a first force sensing branch 3; the two second force sensing units R2 as a second force sensing unit set 4 are connected with a second switch unit S2 in parallel in a second force sensing branch 3; the two third force sensing units R3 as a third force sensing unit set 4 are connected with the third switch unit S3 in parallel in a third force sensing branch 3.

The plurality of force sensing units 1 shown in FIG. 13 and FIG. 14 can be controlled through a third manner as follows, a plurality of switch units 5 is divided into a plurality switch unit sets, each switch unit set includes one or more switch unit 5. For example, the plurality of switch units 5 shown in FIG. 13 or FIG. 14 is divided into three switch unit sets, the first switch unit set includes a first switch unit S1, the second switch unit set includes a second switch unit S2, and the third switch unit set includes a third switch unit S3. The display panel works in multiple force sensing periods, each force sensing period successively includes a first force sensing stage corresponding to the first switch unit set, a second force sensing stage corresponding to the second switch unit set and a third force sensing stage corresponding to the third switch unit set. At the first force sensing stage, the first switch unit S1 is turned off, the second switch unit S2 and the third switch unit S3 are turned on, at this time, only two first force sensing units R1 are working, a bias voltage input circuit 2 only needs to provide a voltage to the two first force sensing units R1, and detect voltage values output by the two first force sensing units R1, so as to judge the magnitude of the force suffered by the display panel at the positions of the two first force sensing units R1 is; at the second force sensing stage, the second switch unit S2 is turned off, the first switch unit S1 and the third switch unit S3 are turned on, at this time, the bias voltage input circuit 2 only needs to provide a voltage to the two second force sensing units R2, and detect voltage values output by the two second force sensing units R2, so as to judge the magnitude of the force suffered by the display panel at positions of the two second force sensing units R2; at the third force sensing stage, the third switch unit S3 is turned off, the first switch unit S1 and the second switch unit S2 are turned on, at this time, the bias voltage input circuit 2 only needs to provide a voltage to the two third force sensing units R3, and detect voltage values output by the two third force sensing units R3, so as to judge the magnitude of the force suffered by the display panel at positions of the two third force sensing unit R3.

Figure 15:
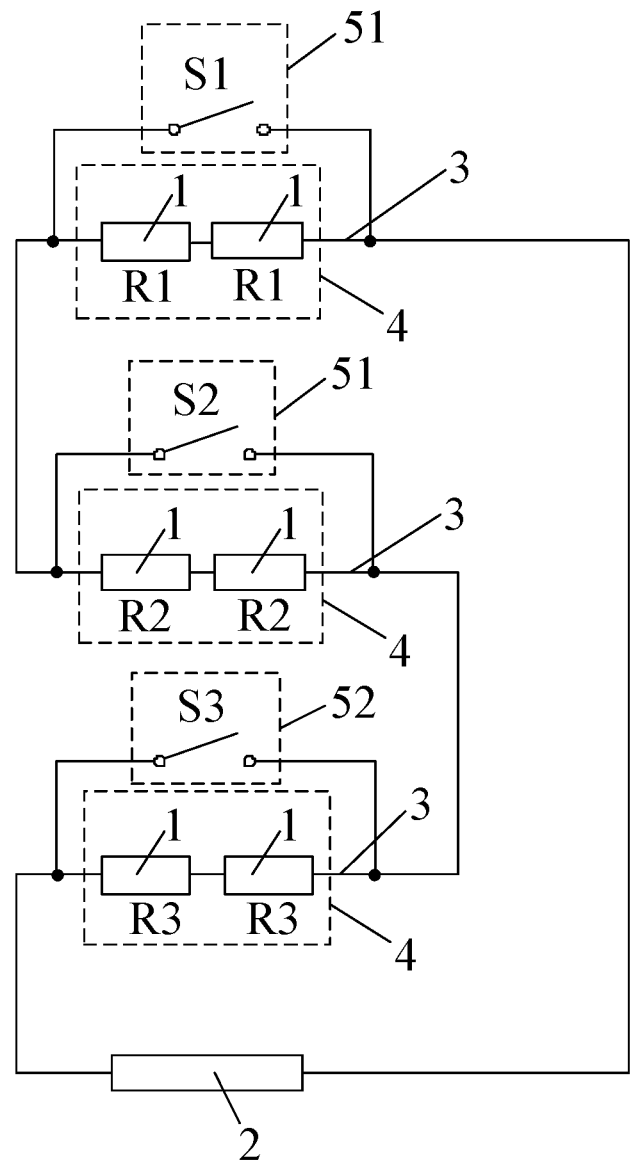
FIG. 15 illustrates a schematic diagram of a switch unit in FIG. 13 being divided according to a fourth manner.
Figure 16:
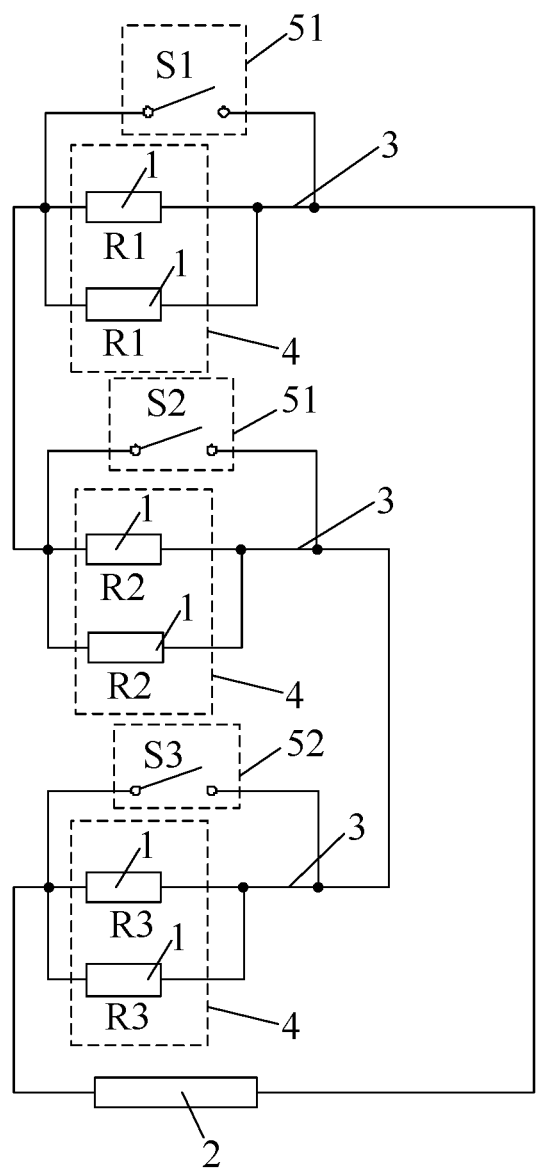
FIG. 16 illustrates a schematic diagram of a switch unit in FIG. 14 being divided according to a fourth manner.

Besides, the plurality of force sensing units 1 shown in FIG. 10 and FIG. 11 can also be controlled through a fourth manner as follows, a plurality of switch units 5 is divided into a plurality switch unit sets, each switch unit set includes one or more switch unit 5. For example, the plurality of switch units 5 in FIG. 10 or FIG. 11 are divided into two switch unit sets, as shown in FIG. 15 and FIG. 16, FIG. 15 illustrates a schematic diagram of a switch unit in FIG. 13 being divided according to the fourth manner, FIG. 16 illustrates a schematic diagram of a switch unit in FIG. 14 being divided according to the fourth manner. The first switch unit set 51 includes a first switch unit S1 and a second switch unit S2, the second switch unit set 52 includes a third switch unit S3, the display panel works in multiple force sensing periods, each force sensing period successively includes a first force sensing stage corresponding to the first switch unit set 51, a second force sensing stage corresponding to the second switch unit set 52. At the first force sensing stage, the first switch unit S1 and the second switch unit S2 are turned off, the third switch unit S3 is turned on, at this time, the bias voltage input circuit 2 only needs to provide a voltage to the two first force sensing units R1 and the two second force sensing units R2, and detect voltage values output by the two first force sensing units R1 and the two second force sensing units R2, so as to judge the magnitude of the force suffered by the display panel at positions of the two first force sensing unit R1 and the two second force sensing units R2; at the second force sensing stage, the third switch unit S3 is turned off, the first switch unit S1 and the second switch unit S2 are turned on, at this time, the bias voltage input circuit 2 only needs to provide a voltage to the two third force sensing units R3, and detect voltage values output by the two third force sensing units R3, so as to judge the magnitude of the force suffered by the display panel at positions of the two third force sensing units R3.

It should be understood that, in the structure shown in FIG. 13, the plurality of force sensing units 1 in each force sensing branch 3 are mutually connected in series, in the structure shown in FIG. 14, the plurality of force sensing units 1 in each force sensing branch 3 are mutually connected in parallel. When considering resistance of the connecting lines, if one switch unit 5 is turned off, which means that, in the corresponding force sensing branch 3, two force sensing units 1 in FIG. 13 are connected in series and then connected with the resistance of connecting line in series, while two force sensing units 1 in FIG. 14 are connected in parallel and then connected with the resistance of connecting line in series. Therefore, compared with FIG. 14, in the structure shown in FIG. 13, the voltage obtained by the force sensing unit 1 after voltage division is larger, so that the sensitivity of the force sensing unit 1 is higher. Besides, the plurality of force sensing units 1 shown in FIG. 13 or FIG. 14 can also be controlled through other manners except for the above-mentioned third manner and fourth manner, as long as the force sensing units 1 can use the input voltage by time division, i.e., in each stage, only a part of the force sensing units 1 can obtain the bias voltage provided by the bias voltage input circuit 2 to work.

The display panel provided by the embodiments of the present disclosure is provided with switch units corresponding to the force sensing units, the force sensing process is divided into multiple stages, in different stages, the plurality of force sensing units can use the input voltage by time division through controlling the switch units, so that at each stage, only a part of the force sensing units obtain the bias voltage provided by the bias voltage input circuit at each stage to work. However, in the prior art, the bias voltage input circuit needs to provide a bias voltage to all the force sensing units at the same time, compared with the prior art, the embodiments of the present disclosure improves the bias voltage obtained by each force sensing unit during working, so as to improve sensitivity of the force sensing unit.

Figure 17:
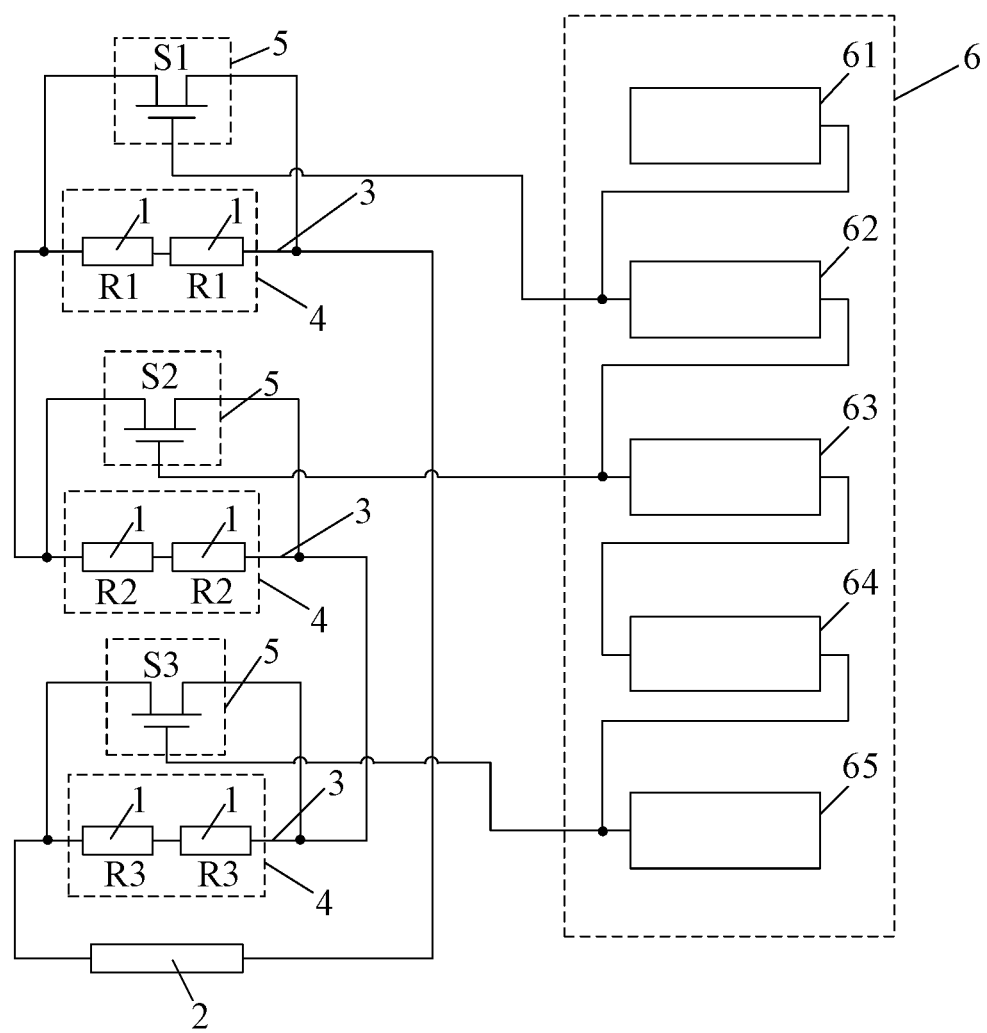
FIG. 17 illustrates a schematic diagram of another connection of a part of force sensing units in FIG. 3.
Figure 18:
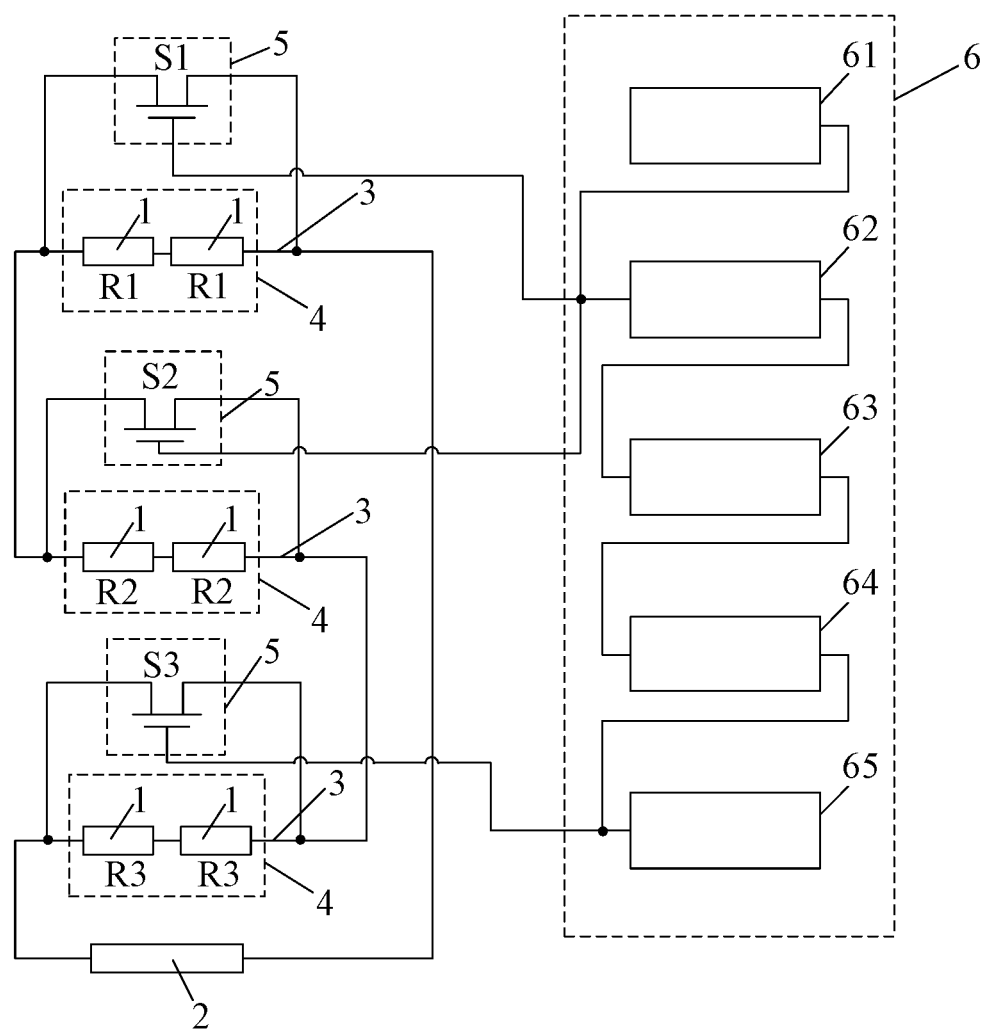
FIG. 18 illustrates a schematic diagram of another connection of a part of force sensing units in FIG. 3.

Optionally, as shown in FIG. 17 and FIG. 18, FIG. 17 illustrates a schematic diagram of another connection of a part of force sensing units in FIG. 3, FIG. 18 illustrates a schematic diagram of another connection of a part of force sensing units in FIG. 3. Each switch unit 5 has a control end; the display panel includes a gate electrode drive circuit 6, the gate electrode drive circuit 6 includes a plurality of vertical shift registers; the shift registers include a plurality of assigned shift registers, each assigned shift register is corresponding to one or more switch unit 5; an input end of the assigned shift register is electrically connected with the control end of the corresponding switch unit 5.

The gate electrode drive circuit 6 is configured to provide a scan signal to the gate line in the display area, in order to achieve the turn-on or turn-off of the thin film transistor connected with the gate line in a display area, so as to achieve display function. Since the vertical shift registers in the gate electrode drive circuit 6 successively output a pulse signal to each gate line, therefore, the switch units 5 can be controlled directly using the pulse signals output by the shift registers. The structure shown in FIG. 17 is corresponding to the third manner, the gate electrode drive circuit 6 includes successively vertical a first shift register 61, a second shift register 62, a third shift register 63, a fourth shift register 64 and a fifth shift register 65, where the first shift register 61, the second shift register 62 and the fourth shift register 64 are assigned shift registers, an output end of the first shift register 61 is electrically connected with a corresponding control end of the first switch unit S1, an output end of the second shift register 62 is electrically connected with a control end of the corresponding second switch unit S2, an output end of the fourth shift register 64 is electrically connected with a control end of the corresponding third switch unit S3. During the working process of the gate electrode drive circuit 6, the first shift register 61 firstly outputs first level, at the same time, the first level is output to the control end of the first switch unit S1, so that the first switch unit S1 is turned off, while all other shift registers output a second level, so that the second switch unit S2 and the third switch unit S3 are turned on, thereby entering into the first force sensing stage; and then, the first shift register 61, the third shift register 63, the fourth shift register 64 and the fifth shift register 65 output a second level, and the second shift register 62 outputs a first level, so that the second switch unit S2 is turned off, the first switch unit S1 and the third switch unit S3 are turned on, thereby entering into the second force sensing stage; and then, the third shift register 63 outputs a second level, and all the other shift registers output a first level, so that all switch units 5 are turned on; and then, the fourth shift register 64 outputs a second level, all the other shift register outputs a first level, so that the third switch unit S3 is turned off, and the first switch unit S1 and the second switch unit S2 are turned on, thereby entering into the third force sensing stage. Therefore, the switch unit 5 can be directly controlled through the gate electrode drive circuit 6, it is unnecessary to provide a corresponding control circuit separately, so as to save cost and reduce occupied space. It should be explained that, the first level is for turning on the switch unit 5, at the same time, the first level is for turning off the thin film transistor connected with the gate line in the display area; the second level is for turning off the switch unit 5, at the same time, the second level is for turning on the thin film transistor connected with the gate line in the display area. Besides, the structure shown in FIG. 18 is corresponding to the fourth manner, where the output end of the first shift register 61 is electrically connected with the corresponding control ends of the first switch unit S1 and the second switch unit S2, the output end of the fourth shift register 64 is electrically connected with the control end of the third switch unit S3, the control manner of each switch unit 5 by the gate electrode drive circuit 6 is similar to the control manner in FIG. 17, which will not be repeated herein.

Optionally, as shown in FIG. 17 or FIG. 18, the switch unit 5 is a first thin film transistor.

Optionally, the display panel includes a plurality subpixel units (not shown in figures) arranged in a matrix, each sub-pixel unit is corresponding to one second thin film transistor (not shown in figures), the second thin film transistor is electrically connected with the gate electrode drive circuit 6. The gate electrode of the second thin film transistor corresponding to each row of sub-pixel units is electrically connected with the output end of one shift register in the gate electrode drive circuit 6 through the gate line; the first thin film transistor is an N-type thin film transistor, the second thin film transistor is a P-type thin film transistor; or the first thin film transistor is a P-type thin film transistor, the second thin film transistor is an N-type thin film transistor.

Figure 19:
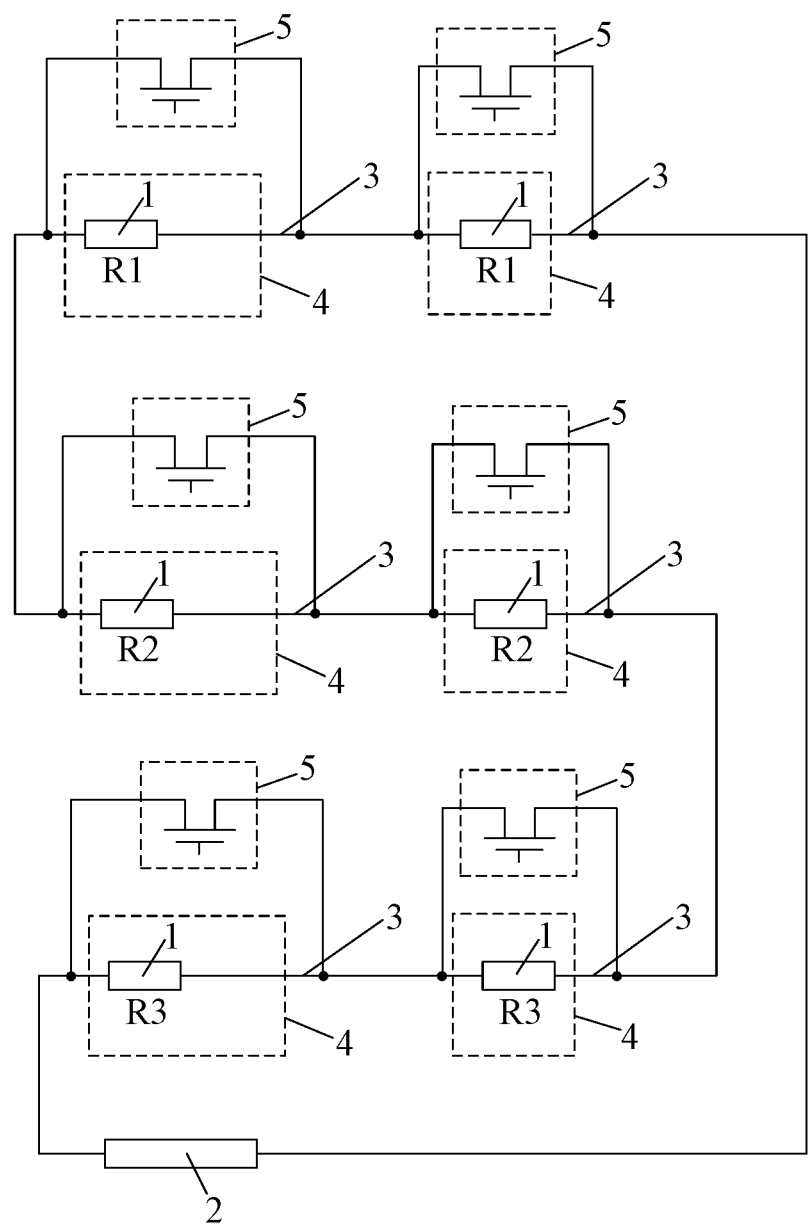
FIG. 19 illustrates a schematic diagram of another connection of a part of force sensing units in FIG. 3.

Optionally, as shown in FIG. 19, FIG. 19 illustrates a schematic diagram of another connection of a part of force sensing units in FIG. 3. Each force sensing unit set 4 only includes one force sensing unit 1. In the structure shown in FIG. 19, during the force detecting process, six switch units 5 are divided into six switch unit sets, that is, each switch unit set only includes one switch unit 5, the display panel works in a plurality of force sensing periods, each force sensing period successively includes six force sensing stages respectively corresponding to six switch units 5, in each force sensing stage, only the corresponding switch unit 5 is turned off, all other switch units 5 are turned on, thus, the bias voltage input circuit 2 only needs to provide a voltage to one force sensing unit 1, the bias voltage obtained by each force sensing unit 1 during working can be further increased, so as to further improve sensitivity of the force sensing unit 1.

It should be noted that, the specific structure and principle of the force sensing unit in the present embodiment is the same as the above-mentioned embodiments, which will not be repeated herein.

An embodiment of the present disclosure also provides a method for controlling a display panel, the display panel can be any one of the above-mentioned display panels shown in FIGS. 4-10, a plurality of switch units 5 are divided into a plurality of switch unit sets, each switch unit set includes one or more switch unit 5, the display panel works in a plurality of force sensing periods, each force sensing period includes force sensing stages corresponding to the switch unit sets, the method includes: in each force sensing stage, controlling the switch unit 5 in the switch unit set corresponding to the present force sensing stage to be turned on, and controlling the switch unit 5 in the switch unit set not corresponding to the force sensing stage to be turned off.

It should be noted that, the control method has be described in the first manner and the second manner in above embodiments, which will not be repeated herein.

In the method for controlling the display panel provided by the embodiments of the present disclosure, the display panel is provided with switch units corresponding to the force sensing units, the force sensing process is divided into multiple stages, in different stages, the plurality of force sensing units can use the input voltage by time division through controlling the switch units, so that at each stage, only a part of the force sensing units obtain the bias voltage provided by the bias voltage input circuit to work. However, in the prior art, the bias voltage input circuit needs to provide a bias voltage to all the force sensing units at the same time, compared with the prior art, the embodiments of the present disclosure improves the bias voltage obtained by each force sensing unit during working, so as to improve sensitivity of the force sensing unit.

An embodiment of the present disclosure further provides a method for controlling a display panel, the display panel can be any one of the above-mentioned display panels shown in any one of FIGS. 13-19, a plurality of switch units 5 are divided into a plurality of switch unit sets, each switch unit set includes one or more switch unit 5, the display panel works in a plurality of force sensing periods, each force sensing period includes force sensing stages corresponding to the switch unit sets, the method includes: in each force sensing stage, controlling the switch unit 5 in the switch unit set corresponding to the present force sensing stage to be turned off, and controlling the switch in the switch unit 5 in the switch unit set not corresponding to the force sensing stage to be turned on.

It should be noted that, the control method has be described in the third manner and the fourth manner in above embodiments, which will not be repeated herein.

In the method for controlling the display panel provided by the embodiments of the present disclosure, the display panel is provided with switch units corresponding to the force sensing units, the force sensing process is divided into multiple stages, in different stages, the plurality of force sensing units can use the input voltage by time division through controlling the switch units, so that at each stage, only a part of the force sensing units obtain the bias voltage provided by the bias voltage input circuit to work. However, in the prior art, the bias voltage input circuit needs to provide a bias voltage to all the force sensing units at the same time, compared with the prior art, the embodiments of the present disclosure improves the bias voltage obtained by each force sensing unit during working, so as to improve sensitivity of the force sensing unit.

Figure 20:
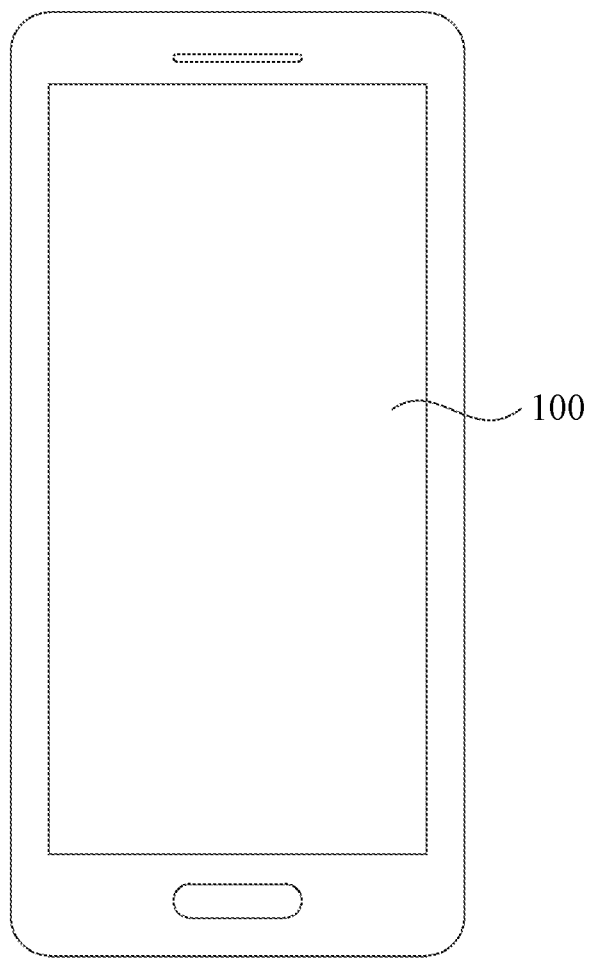
FIG. 20 illustrates a structural schematic diagram of a display device according to an embodiment of the present disclosure.

As shown in FIG. 20, FIG. 20 illustrates a structural schematic diagram of a display device according to an embodiment of the present disclosure. The embodiment of the present disclosure also provides a display device, including the above-mentioned display panel 100.

The specific structure and principle of the display panel in the present embodiment is the same as the above-mentioned embodiment, which will not be repeated herein. The display device can be any electronic device having display function, such as touch screen, cellphone, tablet computer, laptop computer, electronic paper, television and the like.

The display device provided by the embodiments of the present disclosure is provided with switch units corresponding to the force sensing units, the force sensing process is divided into multiple stages, in different stages, the plurality of force sensing units can use the input voltage by time division through controlling the switch units, so that at each stage, only a part of the force sensing units obtain the bias voltage provided by the bias voltage input circuit to work. However, in the prior art, the bias voltage input circuit needs to provide a bias voltage to all the force sensing units at the same time, compared with the prior art, the embodiments of the present disclosure improves the bias voltage obtained by each force sensing unit during working, so as to improve sensitivity of the force sensing unit.

The above are only preferred embodiments of the present disclosure, which cannot limit the present disclosure. Any modification, equivalent substitution and improvement made within the spirit and principle of the present disclosure shall fall into the protection scope of the present disclosure.

What is claimed is:

1. A display device, comprising a display panel, wherein the display panel comprises:
   a plurality of force sensing branches connected in parallel;
   a plurality of force sensing unit sets respectively corresponding to the plurality of force sensing branches; and
   a plurality of switch units respectively corresponding to the plurality of force sensing branches, each of the plurality of switch units is connected in series in a corresponding force sensing branch;
   wherein each of the plurality of force sensing branches comprises one of the plurality of force sensing unit set and one of the plurality of switch units, each of the plurality of force sensing unit sets comprises one or more force sensing units, each force sensing unit comprises a first input end and a second input end, the first input ends of all force sensing units in all of the plurality of force sensing branches are connected to one another, and the second input end of each force sensing unit in each of the plurality of force sensing branches is connected to one of the plurality of switch units,
   each of the force sensing units is a silicon piezoresistive force sensor, the silicon piezoresistive force sensor comprises four edges, the first input end, the second input end, a first output end and a second output end, the four edges are respectively connected with the first input end, the second input end, the first output end and the second output end, the first input end and the second input end are respectively connected with two opposite edges of the four edges, and the first output end and the second output end are respectively connected with the other two opposite edges of the four edges.

2. A display panel, comprising:
   a plurality of force sensing branches connected in parallel;
   a plurality of force sensing unit sets respectively corresponding to the plurality of force sensing branches; and
   a plurality of switch units respectively corresponding to the plurality of force sensing branches, each of the plurality of switch units is connected in series in a corresponding force sensing branch;
   wherein each of the plurality of force sensing branches comprises one of the plurality of force sensing unit set and one of the plurality of switch units, each of the plurality of force sensing unit sets comprises one or more force sensing units, each force sensing unit comprises a first input end and a second input end, the first input ends of all force sensing units in all of the plurality of force sensing branches are connected to one another, and the second input end of each force sensing unit in each of the plurality of force sensing branches is connected to one of the plurality of switch units,
   each of the force sensing units is a silicon piezoresistive force sensor, the silicon piezoresistive force sensor comprises four edges, the first input end, the second input end, a first output end and a second output end, the four edges are respectively connected with the first input end, the second input end, the first output end and the second output end, the first input end and the second input end are respectively connected with two opposite edges of the four edges, and the first output end and the second output end are respectively connected with the other two opposite edges of the four edges.

3. The display panel according to claim 2, further comprising:
   a gate electrode drive circuit, the gate electrode drive circuit comprising a plurality of vertical shift registers;
   wherein the plurality of shift registers comprises multiple assigned shift registers, and each of the assigned shift registers corresponds to one or more of the switch units;
   wherein each of the switch units has a control end; and
   wherein an output end of each of the assigned shift registers is electrically connected with the control end of the corresponding one or more of the switch units.

4. The display panel according to claim 3, wherein the plurality of switch units are thin film transistors.

5. The display panel according to claim 2, wherein the display panel has a display area and a non-display area surrounding the display area; and
   the plurality of force sensing unit sets is located in the non-display area.

6. The display panel according to claim 2, wherein each of the force sensing unit sets comprises a single force sensing unit.

* * * * *